(12) United States Patent
Yashiro et al.

(10) Patent No.: US 6,703,635 B2
(45) Date of Patent: Mar. 9, 2004

(54) METHOD AND APPARATUS FOR MEASURING THE LEVEL OF LIQUID USING OPTICAL FIBER STRAIN GAUGE

(75) Inventors: Takamasa Yashiro, Tokyo (JP); Satoshi Mochizuki, Tokyo (JP); Takaharu Yoshitomi, Tokyo (JP)

(73) Assignee: NTT Advanced Technology Corporation, Tokyo (JP)

( * ) Notice: Subject to any disclaimer, the term of this patent is extended or adjusted under 35 U.S.C. 154(b) by 254 days.

(21) Appl. No.: 09/803,206

(22) Filed: Mar. 8, 2001

(65) Prior Publication Data

US 2002/0050578 A1 May 2, 2002

(30) Foreign Application Priority Data

Sep. 18, 2000 (JP) .......................... 2000-281922
Feb. 15, 2001 (JP) .......................... 2001-038214

(51) Int. Cl.[7] .................. G01F 23/14; G01F 23/56; G01B 11/00
(52) U.S. Cl. .................. 250/577; 250/900; 73/293; 73/305; 73/322.5; 73/705; 340/619; 385/13
(58) Field of Search ................ 250/573, 577, 250/900–905; 385/12, 13; 73/290 R, 291–293, 305–314, 705, 713; 340/612, 614, 618, 619, 623–625

(56) References Cited

U.S. PATENT DOCUMENTS

| | | | | |
|---|---|---|---|---|
| 5,164,605 A | | 11/1992 | Kidwell .................. 250/577 |
| 5,303,586 A | | 4/1994 | Zhae et al. .................. 73/293 |
| 5,877,426 A | * | 3/1999 | Hay et al. .................. 73/733 |
| 6,026,683 A | | 2/2000 | Lee .................. 73/309 |
| 6,305,227 B1 | * | 10/2001 | Wu et al. .................. 73/705 |
| 6,490,931 B1 | * | 12/2002 | Fernald et al. .................. 73/705 |

FOREIGN PATENT DOCUMENTS

| JP | KOKAI10-148565 | 6/1998 | |
|---|---|---|---|
| JP | 10153475 | 6/1998 | .......... G01F/23/40 |
| JP | KOKAI10-197617 | 7/1998 | |
| JP | KOKAI11-023346 | 1/1999 | |
| JP | KOKAI11-030554 | 2/1999 | |
| JP | 11083601 | 3/1999 | .......... G01F/23/56 |
| JP | KOKAI11-326015 | 11/1999 | |
| JP | KOKAI2000-088629 | 3/2000 | |
| JP | KOKAI2000-097750 | 4/2000 | |

\* cited by examiner

*Primary Examiner*—Gerard R. Strecker
(74) *Attorney, Agent, or Firm*—Blakely, Sokoloff, Taylor & Zafman

(57) ABSTRACT

For measurement of a liquid level, an optical fiber connected at its one end portion to force receiving means movably arranged in liquid to receive force from the liquid is dipped in the liquid together with the force receiving means, and a change in the force acting on said force receiving means when the liquid level changes is detected as a change in strain in the optical fiber by means of an optical fiber strain gauge connected to the other end of the optical fiber, thus measuring a water level of the liquid.

14 Claims, 15 Drawing Sheets

HURDLE

BLIND

NET

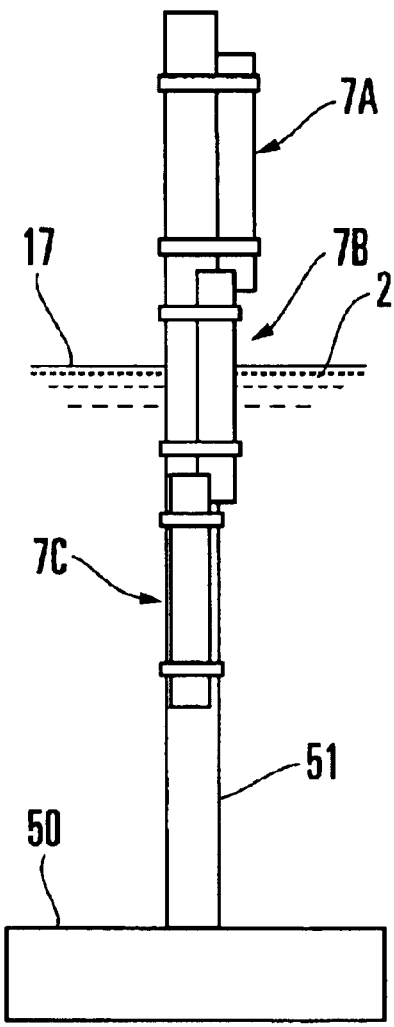
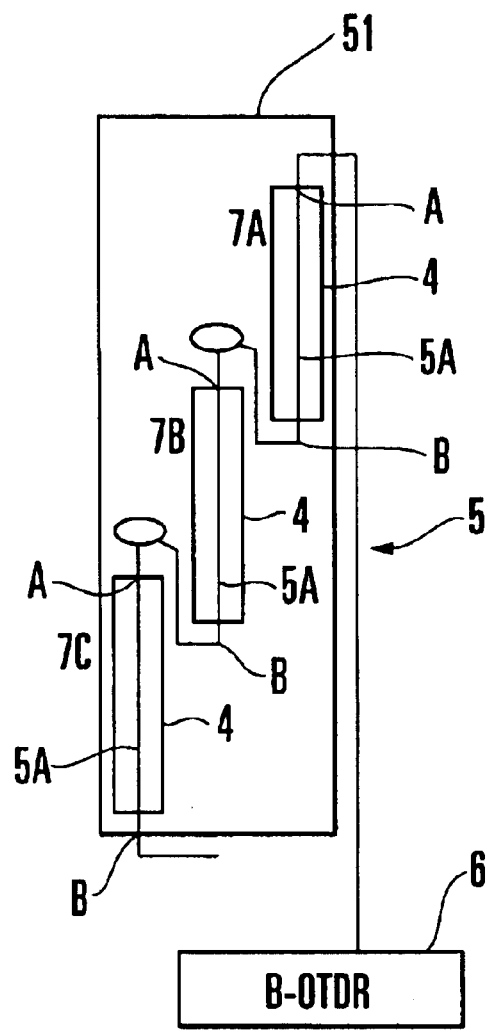
FIG.11A
FIG.11B

METHOD AND APPARATUS FOR MEASURING THE LEVEL OF LIQUID USING OPTICAL FIBER STRAIN GAUGE

BACKGROUND OF THE INVENTION

The present invention relates to a method of measuring a height of liquid level (water level) and a liquid-level gauge and more particularly, to a method and liquid-level gauge for measurement of a water level of liquid by measuring a change in force acted by liquid (buoyancy or hydrostatic pressure) on a body movably arranged in the liquid as a change in strain or strain level in an optical fiber.

Liquid-level gauges for measurement of a height of liquid level (water level) based on various principles have hitherto been proposed. For example, an electrostatic capacitance type liquid-level gauge (JP-A-2000-097750 or JP-A-11-030544), a barometric liquid-level gauge (JP-A-2000-088629), a float type liquid-level gauge (JP-A-10-148565 or JP-A-11-326015), an electrode type liquid-level gauge (JP-A-11-023346) and an electric wave type liquid-level gauge (JP-A-10-197617) have been known. Specifically, the present invention contemplates a float or comparable type liquid-level gauge and a barometric or comparable type liquid-level gauge, especially, using an optical fiber.

The float type liquid-level gauge detects a height of a float that ascends/descends as the liquid-level changes and conventionally, it is classified into two kinds of which one uses reed switches and a magnet and the other uses a wire or a tape. Structurally, the former float type liquid-level gauge using reed switches and a magnet has many reed switches that are operated by the magnet as the float ascends or descends. On the other hand, in the latter float type liquid-level gauge using a wire, a measuring wire attached to a float is wound up to calculate a liquid water level from a windup amount.

On the other hand, a barometric liquid-level gauge as exemplified in FIG. 20 has hitherto been employed. In the barometric liquid-level gauge, an air supply pipe 300 having an open lower end is dipped vertically in liquid 200 stored in a tank 100 and compressed air 500 is supplied to the air supply pipe 300 by means of a pump 400. As the supply of compressed air 500 to the air supply pipe 300 proceeds, air fills in the air supply pipe 300 in opposition to a pressure of the liquid 200 stored in the tank 100. When saturated in the air supply pipe 300, the air is discharged to the liquid 200 in the form of bubbles through the lower open end of the air supply pipe 300. At that time, a pressure P in the air supply pipe 300 equals a head pressure ρH when no gas pressure is applied onto the liquid level, the liquid level in the tank 100 is H and density of the liquid 200 is ρ. Therefore, the pressure P in the air supply pipe 300 is measured by means of a pressure sensor 700 and a measured value is indicated in terms of liquid level height on an indicator.

SUMMARY OF THE INVENTION

In the conventional float type liquid-level gauge, especially, using reed switches and a magnet, however, it is necessary that the magnet be built in the float and a great number of reed switches be incorporated in guide pipes for guiding the float, raising a problem that the number of parts increases and the structure is complicated.

On the other hand, in the float type liquid-level gauge using a wire, many parts such as a windup drum for the wire, a windup motor and a pulley are needed, so that the apparatus is increased in scale and is often troubled because of mechanical windup, thus requiring laborious and time-consuming work for repairs and maintenance.

Further, the conventional barometric liquid-level gauge faces problems that the pump 400 for supplying the compressed air 500 to the air supply pipe 300 is needed and during measurement, the pump 400 must be driven constantly to supply the compressed air 500.

Under the circumstances, the present inventors have studied and conducted experiments in various ways by noticing a change in buoyancy which a body receives from liquid as the liquid level changes in the float type or comparable type (suspension type) liquid-level gauge to confirm that the water level of the liquid can be measured by detecting the change in buoyancy as a change in strain in an optical fiber.

Experiments have been conducted also in the barometric or comparable type liquid-level gauge to confirm that the liquid level height can be measured by displacing a pressure receiving member in accordance with a change in liquid pressure, applying tension to an optical fiber in accordance with the displacement to generate strain in the optical fiber and detecting the strain.

The present invention has been made in the light of the conventional problems and the results of experiments and it is an object of the invention to provide liquid-level measuring method and liquid-level gauge which can measure a water level accurately by using an optical fiber connected to force receiving means movably arranged in liquid to receive force from the liquid and detecting a change in force due to a change in liquid level as strain in the optical fiber or a change in strain therein.

To accomplish the above object, in a method of measuring a liquid level according to the present invention, an optical fiber connected at its one end portion to force receiving means movably arranged in liquid to receive force from the liquid is dipped in the liquid together with the force receiving means, and a change in the force acting on the force receiving means when the liquid level changes is detected as a change in strain in the optical fiber by means of an optical fiber strain gauge connected to the other end of the optical fiber.

The precedently determined correlation between changes in strain in the optical fiber and changes in liquid level of the liquid is consulted on the basis of the detected value to determine a water level of the liquid.

A liquid-level gauge according to the invention comprises an optical fiber, force receiving means connected to one end portion of the optical fiber and movably arranged, together with the optical fiber, in liquid to receive force from the liquid, and optical fiber strain measuring means connected to the other end portion of the optical fiber to detect, as a change in strain in the optical fiber, a change in the force acting on the force receiving means when the liquid level of the liquid changes.

Preferably, the optical fiber strain measuring means is a Brillouin-optical time domain reflector (hereinafter simply referred to as B-OTDR).

According to one aspect of the invention, in a method of measuring a liquid level, a float having a cross-sectional form that is uniform in the height direction and a specific weight value less than that of liquid is dipped in the liquid, the float is supported by an optical fiber in such a manner that an upper end of the optical fiber constantly protrudes from the liquid level, the optical fiber is connected at its upper end to an optical fiber strain gauge, and a change in buoyancy acting on the float as the water level of the liquid changes is detected as a change in strain in the optical fiber by means of the optical fiber strain gauge, thus measuring a water level of the liquid.

According to a second aspect of the invention, in a method of measuring a liquid level, a suspension member having a cross-sectional form that is uniform in the height direction and a specific weight value not less than that of liquid is suspended by an optical fiber so as to be dipped in the liquid in such a manner that an upper end of the suspension member constantly protrudes from the liquid level, the optical fiber is connected to an optical fiber strain gauge, and a change in buoyancy acting on the suspension member as the water level of the liquid changes is detected as a change in strain in the optical fiber by means of the optical fiber strain gauge, thus measuring a water level of the liquid.

In embodiments of the float type liquid-level gauge according to the invention, a liquid-level gauge comprises a float having a cross-sectional form that is uniform in the height direction and a specific weight value less than that of liquid and dipped in the liquid, an optical fiber for supporting the float in such a manner that an upper end of the float constantly protrudes from the liquid level, and an optical fiber stain gauge for detecting a change in buoyancy acting on the float due to a change in water level of the liquid as a change in strain in the optical fiber.

A liquid-level gauge comprises a suspension member having a cross-sectional form that is uniform in the height direction and a specific weight value not less than that of liquid, an optical fiber for dipping the suspension member in the liquid while suspending the suspension member in such a manner that an upper end of the suspension member constantly protrudes from the liquid level, and an optical fiber strain gauge for detecting a change in buoyancy acting on the suspension member due to a change in water level of the liquid as a change in strain in the optical fiber.

In the liquid-level gauge of the present invention, as the liquid level changes, the magnitude of buoyancy acting on the float or suspension member by the liquid changes. Since the cross-sectional area of each of the float and the suspension member is uniform in the longitudinal direction, the magnitude of the change in liquid level is accurately proportional to the change in buoyancy acting on the float or suspension number. Also, the change in strain level in the optical fiber is accurately proportional to the change in buoyancy. In the case of the float, as the liquid water level increases, tension applied to the optical fiber increases in proportion to the increased water level to raise the strain. In the case of the suspension member, as the water level of the liquid increases to increase the buoyancy, tension applied to the optical fiber decreases in inverse proportion to an increase in water level and the strain decreases correspondingly. Accordingly, in either case, when the change in buoyancy as the change in strain caused in the optical fiber is detected by means of the optical fiber strain gauge, the water level of the liquid can be measured from the correlation between changes in liquid water level and changes in strain.

The liquid to be measured is in no way limited to water in the present invention but the invention may also be applied to measurement of the liquid level of various liquids such as oil and medicines and it will be appreciated that "water level" will be used as a broad word meaning the liquid level height of these kinds of liquids.

According to a third aspect of the invention, in a method of measuring a liquid level by generating strain in an optical fiber in accordance with liquid pressure and detecting the strain to measure a height of liquid level, portions of the optical fiber dipped in liquid are fixed to a fixing member and a pressure receiving member provided in a pressure receiver, respectively, tension is applied to a fiber portion between the fixing member and the pressure receiving member to generate strain in the optical fiber when the pressure receiving member is displaced by a liquid pressure, and the strain is detected by means of an optical fiber strain gauge.

In embodiments of the barometric liquid-level gauge according to the invention, a liquid-level gauge comprises an elongated optical fiber, a pressure receiver having a pressure receiving member displaceable by liquid pressure, fixing members for fixing the optical fiber, and an optical fiber strain gauge for detecting strain in the optical fiber, portions of the optical fiber dipped in the liquid being fixed to the pressure receiving member and the fixing member, respectively, in the liquid and one end of the optical fiber being connected to the optical fiber strain gauge.

In the liquid-level gauge, the pressure receiver has a pressure-tight vessel main body and the pressure receiving member is a piston movable over an opening of the vessel main body to cover it hermetically.

In the liquid-level gauge, the pressure receiver has a pressure-tight vessel main body and the pressure receiving member is a bellows having a pressure receiving plate to hermetically cover an opening of the vessel main body.

In the above barometric type of the present invention, as the liquid level height changes to change the liquid pressure, the magnitude of pressure acting on the pressure receiving member dipped or immersed in the liquid also changes to displace (move or deform) the pressure receiving member. The magnitude of a change in liquid level height is proportional to the magnitude of force resulting from multiplying a change in pressure at a position where the pressure receiver is placed by a pressure receiving area of the pressure receiving member applied with the pressure change. When the pressure receiving member is displaced by a liquid pressure, the optical fiber deforms in proportion to a displacement of the pressure receiving member. In other words, when the liquid level height increases to increase the liquid pressure applied to the pressure receiving member, tension applied to the optical fiber increases in proportion to an increased liquid pressure to increase strain. On the other hand, when the liquid level height decreases to decrease the liquid pressure applied to the pressure receiving member, tension caused in the optical fiber decreases in proportion to a decreased liquid pressure to decrease strain. Accordingly, when the correlation between changes in liquid level height and changes in strain is determined in advance, by detecting a change in liquid pressure acting on the pressure receiving member as a change in strain generated in the optical fiber by means of the optical fiber strain gauge, a liquid level height can be measured accurately from the correlation between the liquid level height and the strain.

In the liquid-level gauge, the vessel main body is provided with a stopper for limiting movement of the pressure receiving member to a predetermined range.

In the liquid-level gauge, the optical fiber has a plurality of portions spaced apart from each other in a direction of depth of the liquid and each fixed by the pressure receiving member and the fixing member.

In the aforementioned barometric type of the invention, the stopper limits the movement of the pressure receiving member to prevent the optical fiber from being broken under the application of excessive tension when the liquid pressure increases.

With a plurality of portions of optical fiber spaced apart from each other in the liquid depth direction and each fixed by the pressure receiving member and fixing member, a liquid level height from a position of each portion can be measured in each portion. For example, when three portions fixed by pressure receiving members and fixing members are provided, a lowermost portion is in charge of measurement of a low liquid level, an intermediate portion is in charge of measurement of an intermediate liquid level and an uppermost portion is in charge of measurement of a high liquid level. In other words, the lowermost portion is for measuring a depth between its position and the intermediate portion, the intermediate portion is for measuring a depth between its position and the uppermost portion and the uppermost portion is for measuring a depth between its position and the liquid level. Accordingly, in case, for example, the intermediate portion is dipped in the liquid during measurement, a depth between the liquid level and the intermediate portion can be measured by detecting strain caused in the intermediate portion and when this depth is added with a depth between the lowermost portion and the intermediate portion, an actual liquid level height can be determined. In case the uppermost portion is dipped, a depth between the liquid level and the uppermost portion can be measured by detecting strain caused in the uppermost portion and when this depth is added with the depth between the lowermost portion and the intermediate portion and the depth between the intermediate portion and the uppermost portion, an actual liquid level height can be determined.

BRIEF DESCRIPTION OF THE DRAWINGS

FIG. 11 is a diagram showing at sections (a) and (b) a front view of a liquid-level gauge according to a third embodiment of the invention and support of a float by an optical fiber.

DESCRIPTION OF THE PREFERRED EMBODIMENTS

Embodiments of the invention will now be described with reference to the accompanying drawings.

Figure 1:
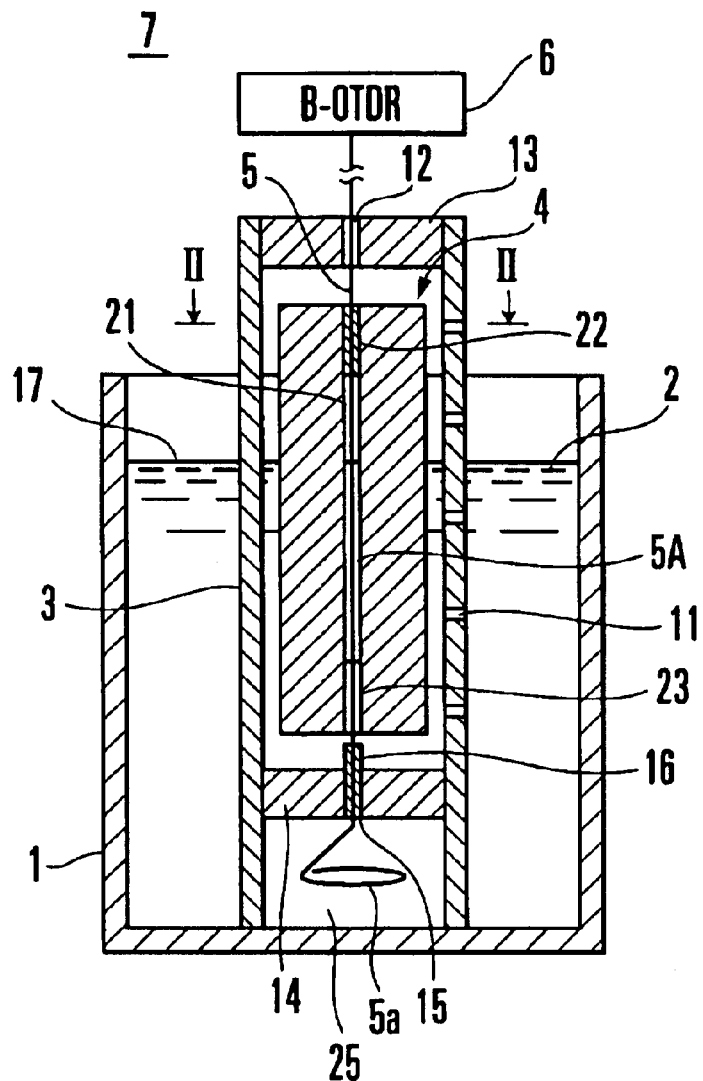
FIG. 1 is a sectional diagram showing a liquid-level gauge according to a first embodiment of the invention.
Figure 2:
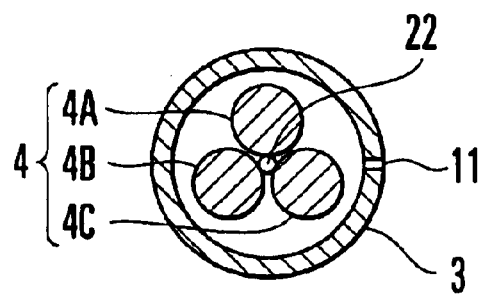
FIG. 2 is a sectional view on line II—II of FIG. 1.

Referring first to FIGS. 1 and 2, an embodiment of a float type liquid-level gauge according to a first embodiment of the invention will now be described. In these figures, a vessel 1 stores liquid 2 representing an object to be measured, a sleeve 3, an optical fiber 5 supports the float 4 to keep it at a constant height, and an optical fiber strain gauge 6 is coupled to sleeve 3 through a small hole 12 in upper lid 13 through which an optical fiber 5 passes. The optical fiber strain gauge 6, as represented by a Brillouin-optical time domain reflectometer (B-OTDR), detects a strain level in the optical fiber 5. The float 4, optical fiber 5 and B-OTDR 6 constitute float type liquid-level gauge means generally designated by reference numeral 7. More generally, the float constitutes force receiving means movably arranged in liquid to receive force from the liquid.

The sleeve 3 takes a cylindrical form having its top end protruding upwardly of the vessel 1 and a plurality of liquid inlet holes 11 formed in its periphery in the height direction or longitudinal direction at intervals of suitable distance. The number and size of the liquid inlet holes 11 can be changed suitably and are not specified in particular. An upper lid 13 having a small hole 12 through which the optical fiber 5 passes is fixedly fitted in an upper opening of the sleeve 3 and a bottom plate 14 is fixed to an inner wall near the bottom end. A small hole 15 is formed in the bottom plate 15 in the center and a fixing pipe 16 for fixing the optical fiber 5 is fitted in the small hole 15.

Figure 3A:
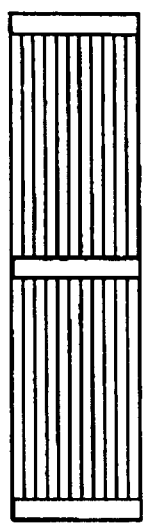
FIG. 3 is a diagram showing at sections (a), (b) and (c) modifications of the sleeve in the first embodiment.
Figure 3B:
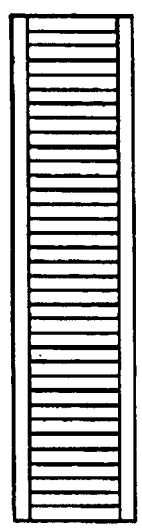
Figure 3C:
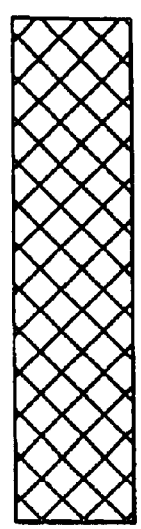

The sleeve 3 is made of any material that cannot be eroded by the liquid 2, such as plastics, metal, ceramics, wood or the like. The sleeve 3 can take any form other than the cylindrical one, for example, a hurdle form, a blind form or a net form as shown at (a), (b) and (c) in FIG. 3 having a structure that permits the liquid 2 to pass therethrough. Preferably, to facilitate the passage of the optical fiber 5, each of the sleeve 3, upper lid 13 and bottom plate 14 is structurally divided into halves and after the optical fiber 5 is passed through the small hole 12 and fixing pipe 16, these halves are put together and bonded to each other by bonding agent or fixed to each other mechanically by means of screws.

Figure 4:
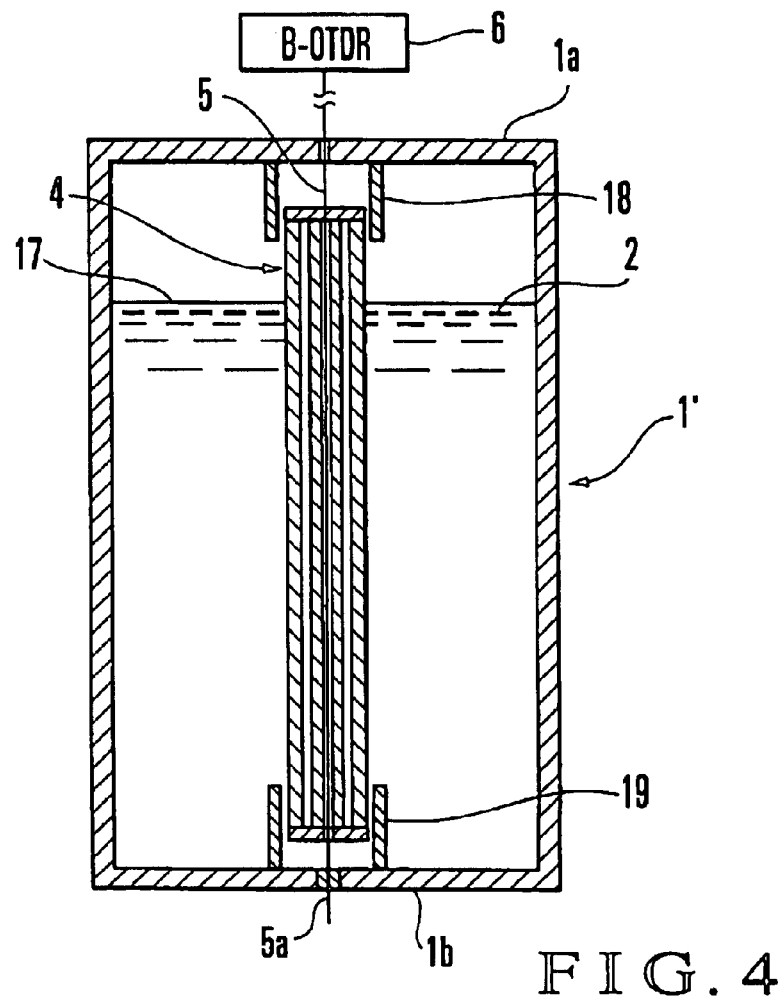
FIG. 4 is a diagram showing a liquid-level gauge according to a modified embodiment of the invention.

In the case of the float type liquid-level gauge 7, the sleeve 3 is mainly used to prevent upside-down motion of the float 4 when a liquid level 17 of liquid 2 lowers until most of the float 4 projects from the liquid level 17. Therefore, the sleeve 3 is not limited to the cylindrical form that accommodates the whole of the float 4 but for example, may take such a structure as shown in FIG. 4 that cylindrical guide members 18 and 19 of a suitable length are fixed to roof plate 1a and bottom plate 1b of a hermetic vessel 1', respectively, upper and lower ends of the float 4 are loosely inserted in these guide members 18 and 19, respectively, so as to be prevented from undergoing upside-down motion. Accordingly, the upper lid 13 and bottom plate 14 of the sleeve 3 are not always necessary.

Referring to FIG. 2 showing a section on line II—II of FIG. 1, the float 4 is constructed of three round bars 4A to 4C so bundled as to contact with each other, leaving a triangular hollow cavity 21 in the center (FIG. 1) through which the optical fiber 5 passes. Each of the round bars 4A to 4C is made of a material having a specific weight value less than that of the liquid 2 such as wood or plastics. Fixedly fitted in the upper and lower ends of the hollow cavity 21 are pipes 22 and 23 through which the optical fiber 5 passes. The float 4 has a length sufficient to cover a change range of the liquid level 17 of liquid 2 and is dipped in the liquid 2 in such a manner that its upper end projects from the maximum water level of the liquid level 17.

Figure 5A:
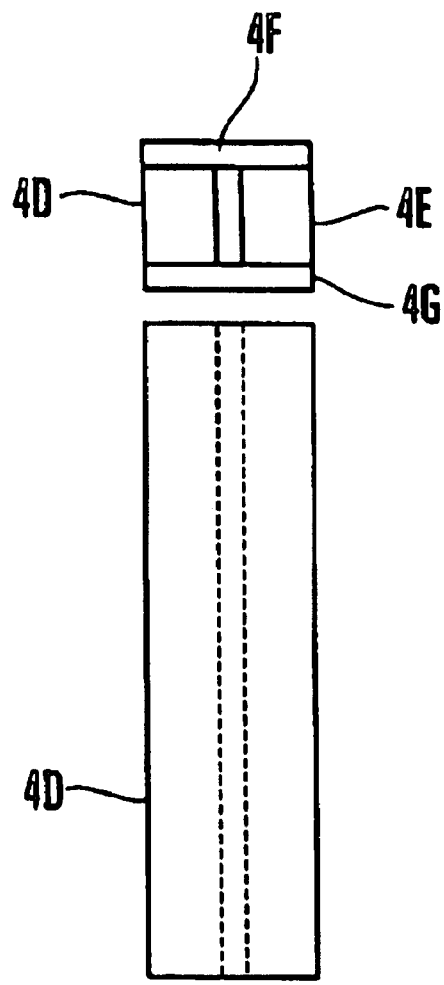
FIG. 5 is a diagram showing at sections (a) and (b) a modification of the float.
Figure 5B:
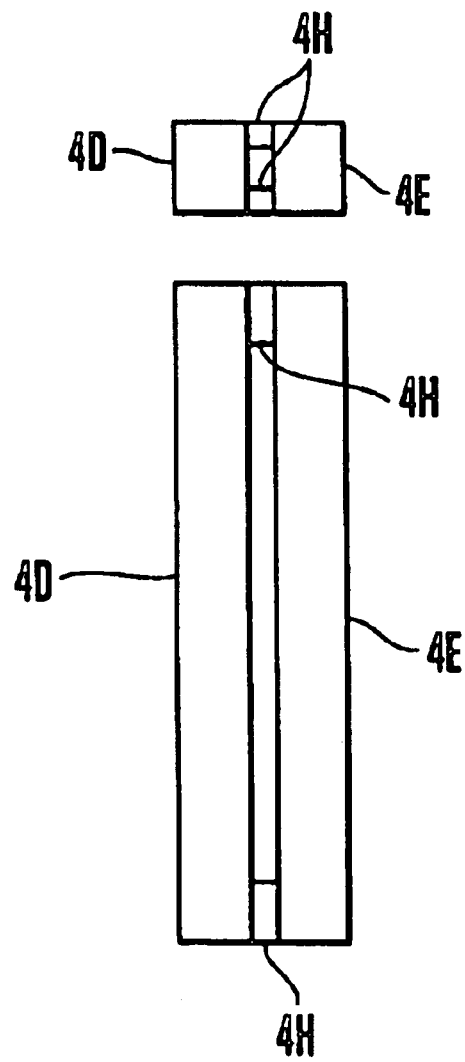

In the first embodiment, the float 4 is exemplified as being formed of the three round bars 4A to 4C but this is not limitative and the float may alternatively be formed of a single round bar having a central through-hole for passage of the optical fiber 5. The circular sectional form is not limitative and the float may take a desired sectional form, for example, a polygonal form such as rectangular or triangular form. In short, any form can be taken provided that the sectional form is uniform over the whole length. For example, as shown at (a) in FIG. 5, the float can be formed into a squared pillar by two squared bars 4D and 4E and two plates 4F and 4G or as shown at (b) in FIG. 5, it can be formed into a squared pillar by two squared bars 4D and 4E and two spacers 4H interposed between upper ends and between lower ends of the squared bars 4D and 4E.

Preferably, since the optical fiber 5 passes through the center of the float 4, the float 4 and each of the pipes 22 and 23 can be structurally divided into halves and after the passage of the optical fiber 5, these halves can be put together and jointed integrally by bonding agent or fixed to each other mechanically by means of, for example, screws. Especially, when these halves are attached with connectors, reinforcement sleeves for fusion connection, the attached members can be utilized for mechanical fixing and screws can be dispensed to facilitate connection.

The optical fiber 5 is sufficiently longer than the float 4 and is passed through the small hole 12 in the upper lid 13, pipe 22, hollow cavity 21, pipe 23 and fixing pipe 16 in the bottom plate 14 so as to pass through the sleeve 3 and float 4. A surplus lower end portion 5a having a length of 2 m or more is accommodated in a space 25 under the bottom plate 14 and its terminal end is applied with a reflection preventive process by coating silicon oil. The optical fiber 5 has its upper end connected to the B-OTDR 6, two intermediate portions fixed to the fixing pipes 16 and 22 by, for example, bonding agent and a fiber portion 5A between the two pipes 16 and 22 that forms a tension change detecting region. It is important to fix the two intermediate portions to the fixing pipes 16 and 22 without applying tension to the optical fiber 5. It is desired that the optical fiber 5 should pass through the small hole 12, pipe 23 and hollow cavity 21 without contacting their inner walls. In the liquid-level gauge shown in FIG. 4, the lower end portion of the optical fiber 5 is fixed to the bottom plate 1b of vessel 1' and a surplus portion 5a protrudes downwardly of the vessel 1'.

The optical fiber 5 is not limited to a solid wire but may be an optical fiber tape, an optical fiber cord or another type used integrally with a member for protection and reinforcement of the optical fiber 5.

Figure 6:
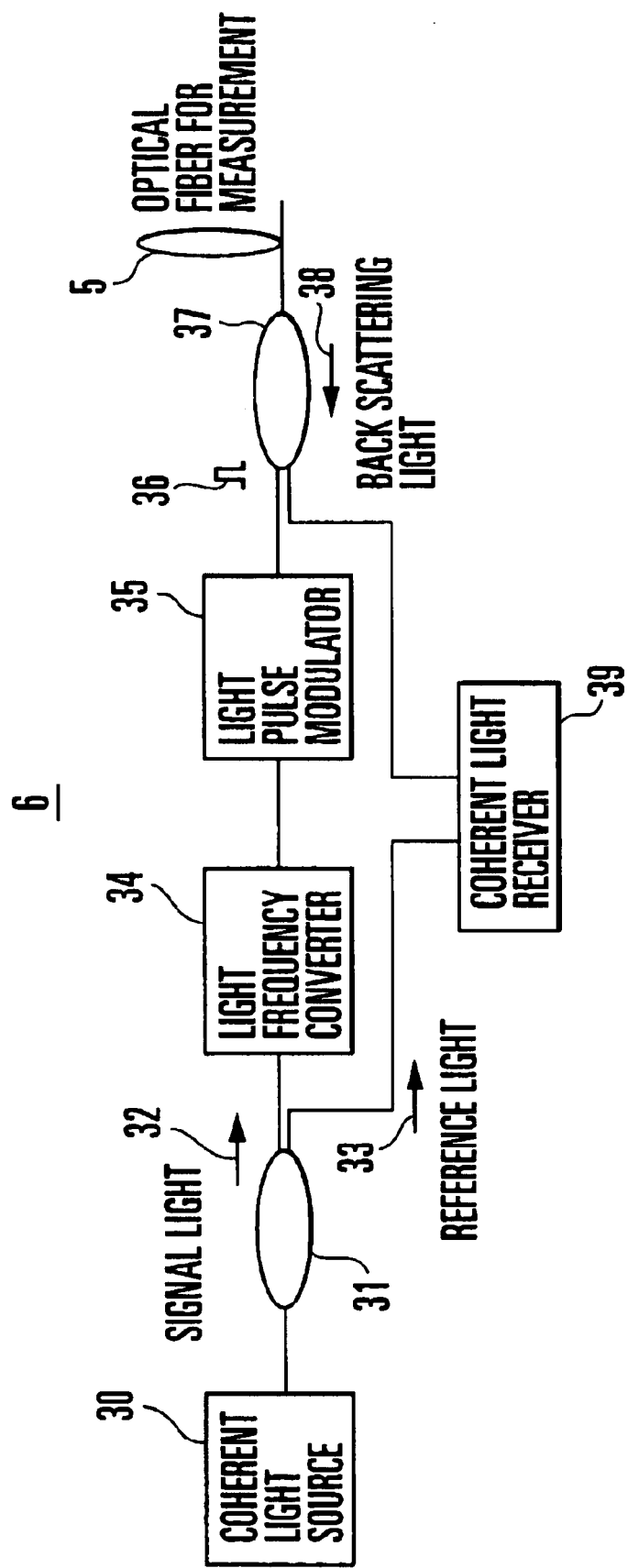
FIG. 6 is a block diagram showing the fundamental construction of an optical fiber strain gauge.

The B-OTDR 6 is a unit for measuring strain distribution or loss distribution in the longitudinal direction of the optical fiber by detecting and analyzing natural Brillouin scattering light, back Raleigh scattering light and Brillouin amplified light in the optical fiber and its fundamental construction is shown in FIG. 6.

The Brillouin scattering light is one of scattering light rays generated when light travels through a medium (optical fiber). When the light is scattered, it is shifted relative to incident light by a frequency inherent to the medium of the optical fiber and in the presence of changes in strain or temperature, the shift amount changes in proportion to the strain in the optical fiber or temperature. Accordingly, by detecting an amount of change in the Brillouin frequency shift, strain applied to the optical fiber can be measured continuously in the longitudinal direction.

Since an amount of change in frequency shift due to temperature change is very smaller than the change amount due to strain change (0.002%/° C.), the influence of temperature can be neglected when the temperature change is small (about 5° C.) during measurement of the amount of change in Brillouin frequency shift due to strain.

In measurement, continuous light of narrow spectrum line width emitted from a coherent light source 30 is first branched to signal light 32 and reference light 33 by means of an optical directional coupler 31. The signal light 32 is changed in light frequency stepwise on time series base and converted into a light pulse train having a time width of about 2 $\mu$ sec (light frequency conversion) by means of a light frequency converter 34, and further converted into a light pulse 36 having a time width of about 10 n sec to 1 $\mu$ sec by means of a light pulse modulator 35 and thereafter, caused to be incident on an optical fiber 5 via a light directional coupler 37. The light pulse 36 coming into the optical fiber 5 undergoes Raleigh scattering and Brillouin scattering in the optical fiber 5 to generate back scattering light 38. The back scattering light 38 is caused to be incident on a coherent light receiver 39 via the light directional coupler 37. On the other hand, the reference light 33 is also incident on the light receiver 39 and the two light rays are subjected to a signal processing to detect a change in strain in the optical fiber 5. In this case, the intensity of the back scattering light 38 in Brillouin scattering is so weak as to amount to about $\frac{1}{100}$ of that of the Raleigh scattering light but by adopting the coherent detection technique and light frequency conversion technique, the Brillouin scattering light in the optical fiber 5 can be detected with high accuracy. This type of B-OTDR for measurement of strain in the optical fiber has hitherto been known (for example, JP-A-10-90121, JP-A-9-89714, JP-A-5-231923 and JP-A-10-197298) and a commercially available one can be used.

In the float type liquid-level gauge 7 as above, the float 4 dipped in the liquid 2 receives vertically upward force, that is, buoyancy from the liquid 2. The buoyancy equals a weight value of the liquid 2 excluded by the float 4. Consequently, the optical fiber 5 supporting the float 4 is applied with tension and strain is generated. As the water level of the liquid 2 changes, the magnitude of buoyancy acting on the float 4 changes, with the result that tension applied to the optical fiber 5 and the strain generated in the fiber also change in proportion to the magnitude of buoyancy. Since the cross-sectional area of the float 4 (also the optical fiber 5) is uniform in the longitudinal direction, the amount of change in water level of the liquid is accurately proportional to a change in buoyancy acting on the float 4. Also, a change in tension and a change in strain in the optical fiber 5 are also accurately proportional to the change in buoyancy. Then, the change in strain is measured by means of the B-OTDR 6. When change amounts of strain and changes in water level are measured in advance through experiments and the correlative relation between them is determined, a water level of the measured liquid or an amount of change in water level can be measured accurately by measuring a change in strain.

Figure 7:
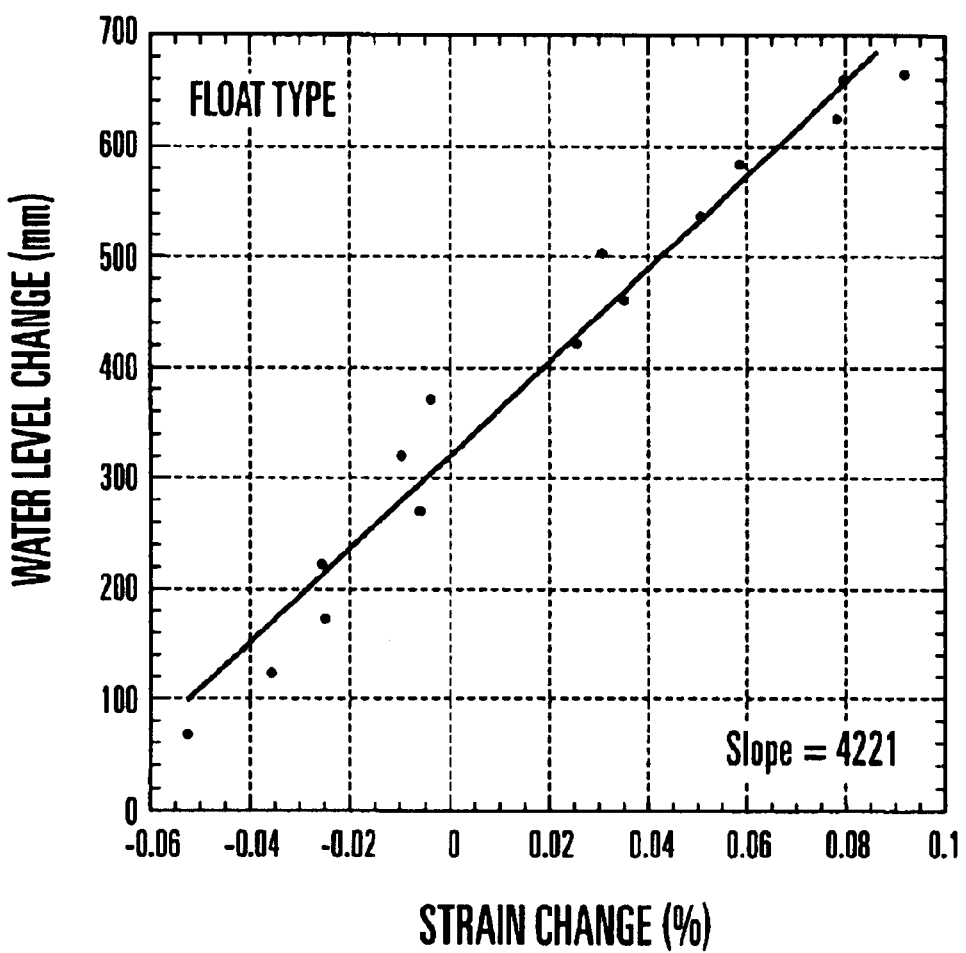
FIG. 7 is a graph showing the relation between a change in strain and a change in water level in the first embodiment.

Referring to FIG. 7, measurement results of strain changes and water level changes are illustrated graphically. For convenience of experiments, the upper limit of water level change is set to 700 mm but by changing design conditions, a larger change in water level can be measured.

The change amount of water level is related to the change amount of strain in the optical fiber 5 by equation (1).

$$(\Delta L / \Delta \varepsilon) = 4 E eq A s / (S \rho g) \quad (1)$$

$$\text{where} \quad A_S = (A_F + A_C)$$

$$Eeq = (A_F E_F + A_C E_C) / A_S$$

$\Delta L$ (m): change amount of liquid level
$\Delta \epsilon$ (%): change amount of strain in optical fiber
$A_F$ (m$^2$): cross-sectional area of optical fiber
$E_F$ (GN/m$^2$): modulus of elasticity of optical fiber
$A_C$ (m$^2$): cross-sectional area of protective layer of optical fiber
$E_C$(GN/m$^2$): modulus of elasticity of protective layer
S(m$^2$): cross-sectional area of float
$L_0$ (m): length of float
$\rho$ (1000 kg/m$^3$): density of liquid
g (9.8 m/sec$^2$): acceleration of gravity Accordingly, the geometrical dimension of the float 4 can be determined by consulting the above equation (1).

Figure 8:
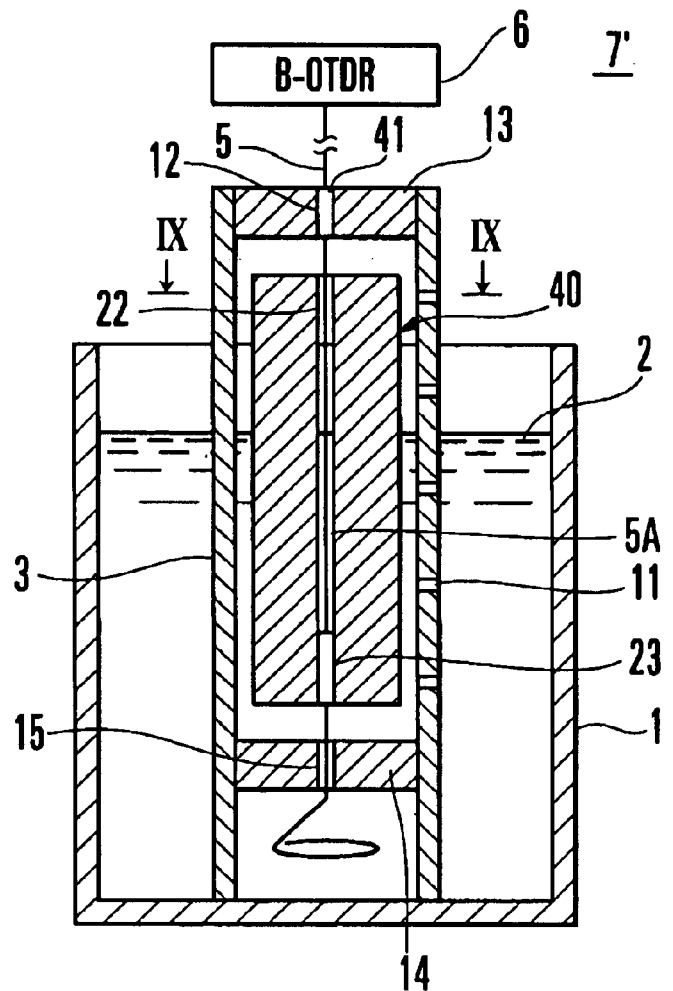
FIG. 8 is a sectional diagram showing a liquid-level gauge according to a second embodiment of the invention.
Figure 9:
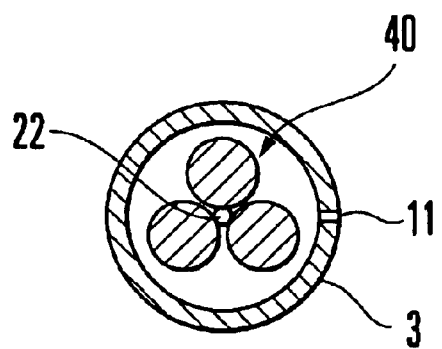
FIG. 9 is a sectional view on line IX—IX of FIG. 8.

Referring to FIGS. 8 and 9, a liquid-level gauge according to a second embodiment of the invention will be described.

In these figures, constituent members identical to those in FIGS. 1 and 2 are designated by identical reference numerals and will not always be described for avoidance of prolixity of explanation. In the second embodiment, a suspension member 40 having a specific weight value not less than that of liquid 2 is suspended by an optical fiber 5 so as to be dipped in the liquid 2 in such a manner that its upper end constantly protrudes from the liquid level. This type of liquid-level gauge is called herein a suspension type liquid-level gauge 7'.

The suspension member 40 is constructed quite identically to the aforementioned float 4 with the only exception that the suspension member 40 is made of a material having a specific weight value not less than that of the liquid 2.

The optical fiber 5 differs from the optical fiber 5 used in the aforementioned float type liquid-level gauge 7 in that two lower portions of the former optical fiber are respectively fixed to a pipe 41 fitted in a small hole 12 in a top lid 13 of sleeve 3 and a pipe 23 mounted to a lower end portion of the suspension member 40 by bonding agent and the present optical fiber passes through a pipe 22 and a small hole 15 in a bottom plate 14 without contacting them. A fiber portion 5A between the pipes 22 and 23 forms a tension change detecting region. More generally, the suspension member constitutes force receiving means movably arranged in the liquid to receive force from the liquid.

In the suspension type liquid-level gauge 7' as above, the suspension member 40 suspended by the optical fiber or optical fiber 5 is dipped in the liquid 2. In the optical fiber 5 suspending the suspension member 40, tension is generated to cause strain to take place. When dipped in the liquid 2, the suspension member 40 receives buoyancy from the liquid 2. The buoyancy equals a weight value of the liquid 2 excluded by the suspension member 40. Because of this buoyancy, the tension in the optical fiber 5 suspending the suspension member 40 decreases to decrease the strain. As the water level of the liquid 2 changes, the magnitude of the buoyancy acting on the suspension member 40 changes and as a result, the tension applied to the optical fiber 5 and the strain generated in the fiber change in proportion to the magnitude of the buoyancy. Since the cross-sectional area of the suspension member 40 is uniform in the longitudinal direction, the magnitude of a change in water level is accurately proportional to a change in buoyancy acting on the suspension member 40. A change in tension and a change in strain are accurately proportional to the change in buoyancy. Then, this change in strain is measured by means of the B-OTDR 6. Strain change amounts and liquid water level changes are measured in advance through experiments to determine the correlation between them, so that by measuring a change in strain, a water level of the liquid or an amount of change in water level can be measured accurately. In the case of the suspension type liquid-level gauge, too, geometrical dimensions of the suspension member 40 can be determined by consulting the aforementioned equation (1).

Figure 10:
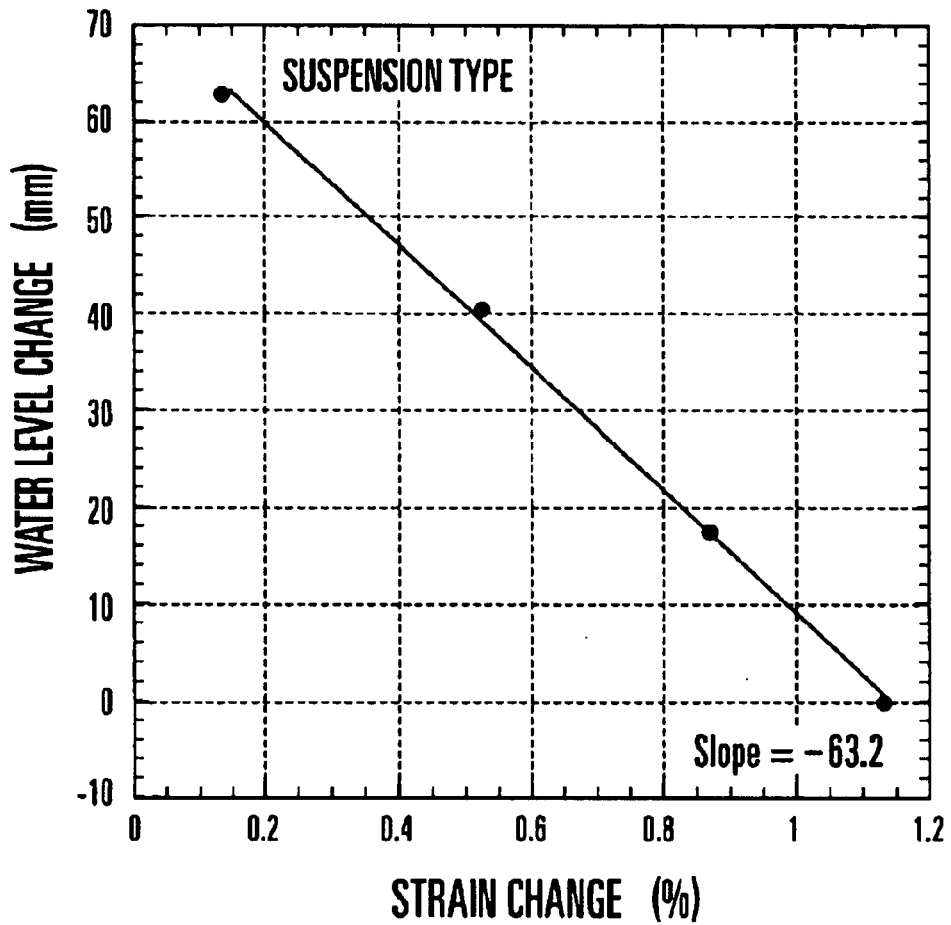
FIG. 10 is a graph showing the relation between a change in strain and a change in water level in the second embodiment.

Referring to FIG. 10, measurement results of strain changes and water level changes of the liquid in the suspension type liquid-level gauge 7' are graphically shown. In contrast to the float type liquid-level gauge 7, the strain increases in inverse proportion to a decrease in water level of the liquid level in the case of the suspension type liquid-level gauge 7'. For the convenience of experiments, the upper limit of the water level change is set to 600 mm but a larger change in water level can be measured by changing design conditions.

Referring to FIG. 11, a liquid-level gauge according to a third embodiment of the invention will be described. FIG. 11 illustrates at section (a) a front view of the third embodiment and at section (b) supporting of floats by an optical fiber.

In the present embodiment, three float type liquid-level gauges 7A, 7B and 7C are mounted to a pillar 51 standing upright on a support base 50 at different heights in a partly overlapping fashion. The respective liquid-level gauges 7A, 7B and 7C are connected in series by a single optical fiber 5. Each of the liquid-level gauges 7A, 7B and 7C is quite identical to the liquid-level gauge 7 shown in FIG. 1. The optical fiber 5 is fixed to the float 4 at point A and to the pillar 51 at point B and a fiber portion 5A between the points A and B in each float 4 is a tension change detecting region. During measurement, the liquid-level gauge 7A is in charge of a high water level, the liquid-level gauge 7B is in charge of a medium water level and the liquid-level gauge 7C is in charge of a low water level.

With this construction, the respective liquid-level gauges 7A, 7B and 7C share in the range of water level to be measured for making the respective actual measurement ranges narrow, thus increasing the efficiency of measurement.

In the foregoing embodiments, the liquid-level gauge has been described by way of example of one for measuring the water level of liquid in the vessel but this is not limitative and it may also be used for measurement of the water level in rivers and storing reservoirs by permitting water to freely come into or go out of the vessel. In addition, by using a material that is not eroded by oil and medicines, the oil level in an oil reserving tank and the liquid level of medicines can also be measured.

In the third embodiment shown in FIG. 11, an example using three float type liquid-level gauges 7A, 7B and 7C has been described but a single liquid-level gauge can also be constructed by using a suitable number of float type liquid-level gauges 7 shown in FIG. 1 and suspension type liquid-level gauges 7' shown in FIG. 8 in combination or using a plurality of suspension type liquid-level gauges 7' alone.

As described above, in the liquid-level measuring method and liquid-level gauge according to the invention, the float having its cross-sectional shape that is uniform in the height direction and a specific weight value less than that of liquid is dipped in the liquid, the float is supported by the optical fiber in such a manner that its top end constantly protrudes from the liquid level, the optical fiber is connected to the optical fiber stain gauge, and a change in buoyancy acting on the float due to a change in water level of the liquid is detected as a change in strain in the optical fiber by means of the optical fiber strain gauge to measure a water level of the liquid, whereby the construction of the float can be simplified, the number of parts can be reduced and a change in liquid level can be measured accurately. Further, occurrence of troubles can be suppressed to facilitate the maintenance and especially, electric parts and a magnet need not be built in the float, thus permitting applications to flammable or non-conductive fluid.

Referring now to FIGS. 12 to 19, embodiments of a barometric liquid-level gauge according to the invention will be described. A barometric liquid-level gauge according to a fourth embodiment of the invention will first be described with reference to FIGS. 12 and 13. In the figures, an open type tank 100 stores liquid 102 representing an object to be measured, and a liquid level gauge 110 measures a height (liquid level height) of water surface 102a the liquid 102.

The liquid level gauge 110 comprises an optical fiber 120 having one end 120a positioned externally of the tank 100 and the other end dipped or immersed in the liquid 102, a support base 113 disposed on the bottom of the tank 100, a fixing member 114 and a pressure receiver 115 which are arranged on the support base 113, an optical fiber strain gauge 116 represented by a B-OTDR 116 arranged on the tank 100, and a fixing member 117 attached to a pressure receiving member 115B of the pressure receiver 115.

One end 112a the optical fiber 112 is connected to the B-OTDR and the other end 112b thereof is coated with silicon oil so as to be applied with a reflection preventive treatment. A suitable intermediate portion of the optical fiber 112 close to the other end and immersed in the liquid 102 has a partial portion of suitable length (between points A and B) that passes through fixing pipes 118 and 119 attached to the aforementioned fixing members 114 and 117, respectively. The partial portion is fixedly secured to these fixing pipes by bonding agent 120X to form a strain detecting portion 112A. The optical fiber 112 inserted in the respective pipes 118 and 119 is fixed thereto in such a way that the optical fiber is not slackened to prevent the strain detecting portion 112A from being deformed and applied with initial tension. A portion of optical fiber 112 extending from the fixing member 117 and terminating in a terminal end 112b forms a surplus length portion 112B.

The fixing member 114 stands upright on one end portion of the support base 113, having an upper end to which one end of the strain detecting portion 112A of optical fiber 112 is fixed through the medium of the fixing pipe 118.

Figure 13:
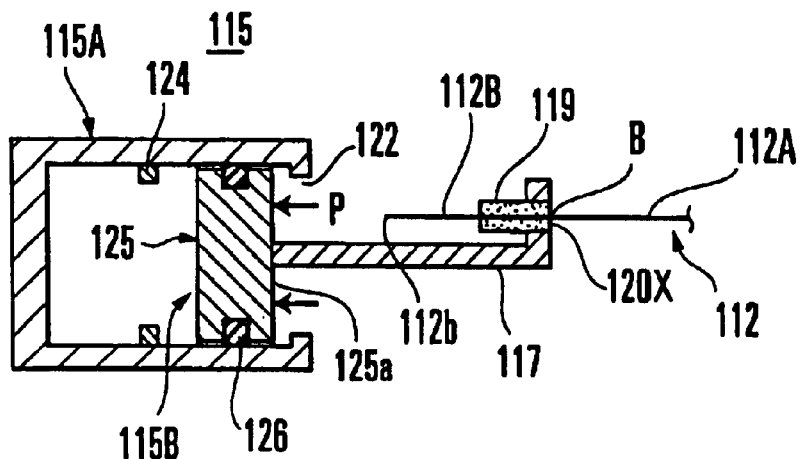
FIG. 13 is a sectional view of a pressure receiver in the fourth embodiment.

As shown in FIG. 13, the pressure receiver 115 includes a pressure-tight vessel main body 115A constituting a cylinder, and the pressure receiving member 115B hermetically blocking an opening 122 of the vessel main body 115A, thus forming an airtight vessel having internal pressure equal to atmospheric pressure. The vessel main body 115A takes the form of a sufficiently rigid cylinder of constant inner diameter having its one end opened and the opening 122 is disposed at the end portion on the support base 113 so as to oppose the fixing member 114. A stopper 124 is disposed in the vessel main body 115A to limit movement of the pressure receiving member 115B to a predetermined range, thereby preventing the optical fiber 112 from being broken.

The pressure receiving member 115B includes a piston 125 of circular plate form movably accommodated in the vessel main body 115A and an O-ring 126 snugly fitted in a circular groove formed in the outer periphery of the piston 125. A surface of piston 125 exposing to the outside through the opening 122 forms a pressure receiving surface 125a for receiving a liquid pressure P. The fixing member 117 has one end connected to the pressure receiving surface 125a and its tip end to which the other end B of strain detecting portion 112A of the optical fiber 112 is fixed through the fixing pipe 119.

Figure 12:
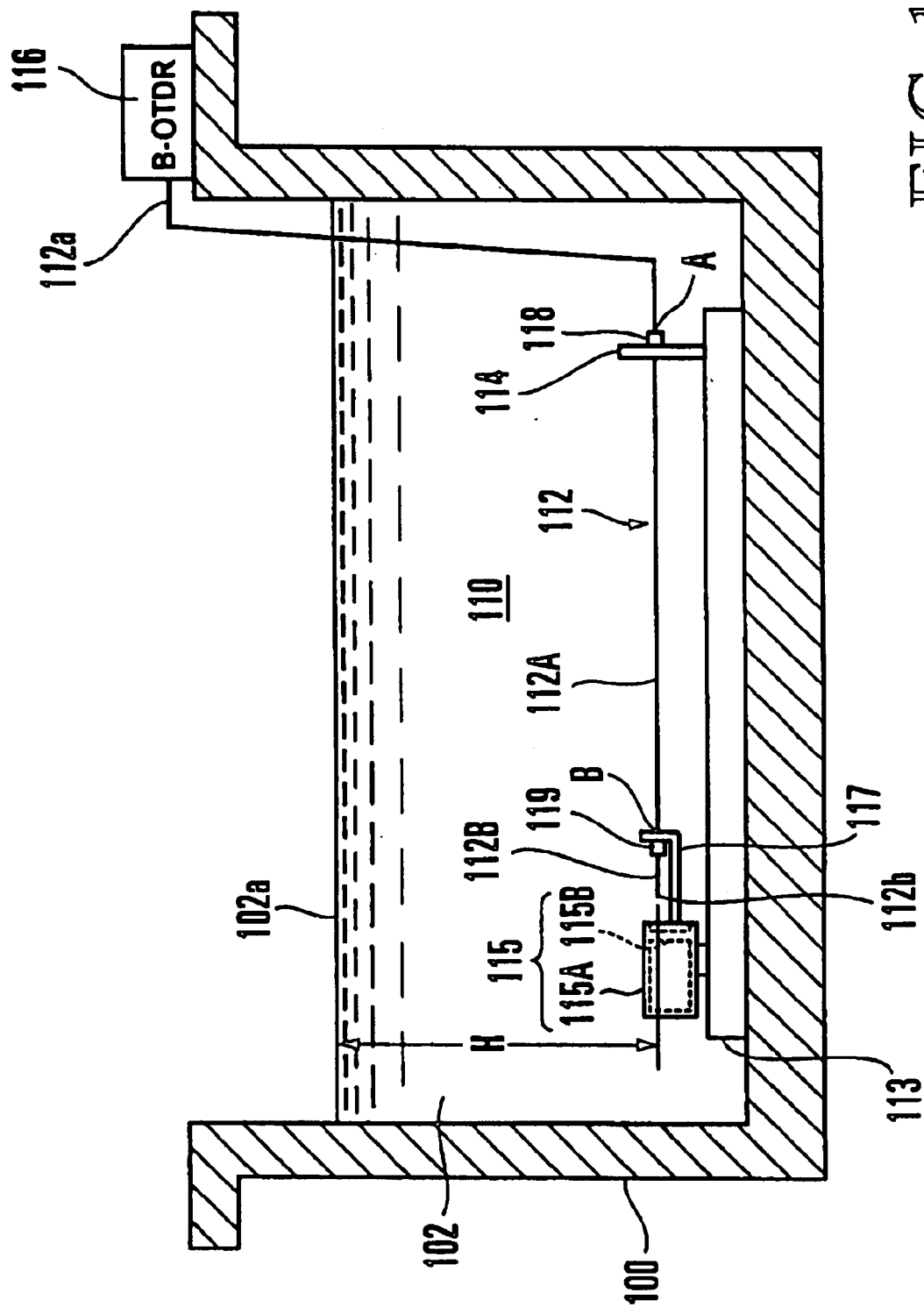
FIG. 12 is a sectional diagram showing a liquid-level gauge according to a fourth embodiment of the invention.

Next, the measurement principle on which the liquid-level gauge 110 according to the fourth embodiment is based will be described with reference to FIG. 12.

Firstly, the optical fiber 112 is immersed in the liquid 102, together with the support base 113, fixing members 114 and 117 and pressure receiver 115. With the pressure receiver 115 immersed in the liquid 102, the piston 125 is applied with the liquid pressure at its pressure receiving surface 125a, so that the piston 125 moves toward the vessel main body 115A until the liquid pressure P balances with the atmospheric pressure in the vessel main body 115A, thus expanding the distance between the fixing members 114 and 117. As a result, tension is applied to the strain detecting portion 112A of the optical fiber 112, causing strain. The strain changes in proportion to a change in liquid pressure P. In other words, when the amount of liquid 102 in the tank 100 increases to raise the liquid pressure P, force acting on the pressure receiving surface 125a of the piston 125 increases and large tension is applied to the strain detecting portion 112A of the optical fiber 112 to increase the strain. Conversely, when the amount of liquid 102 decreases to lower the liquid pressure P, the force acting on the pressure receiving surface 125a of the piston 125 decreases to reduce the level of strain in the strain detecting portion 112A.

In measurement changes in strain in the strain detecting portion 112A of the optical fiber 112 and changes in liquid level height are measured in advance through experiments and the correlation therebetween is determined. Then, after a change in strain is measured by means of the B-OTDR 116, a liquid level height corresponding to the measured value is read from the correlation, thereby ensuring that the liquid level height H of liquid 102 (the distance between the center of the pressure receiving surface 125a and the liquid surface 102a can be measured.

In the present embodiment, the strain in the optical fiber 112 is detected using the B-OTDR 116 but this type of detection is not limitative and measurement can be effected using an optical fiber strain gauge based on the different principle, for example, an optical fiber strain gauge using the fiber Bragg grating (hereinafter abbreviated as FBG) method. The FBG method uses a detecting element using an optical fiber whose core portion has the refractive index that changes periodically in the fiber axis direction and in the FBG method, of light rays coming into the detecting element, only a ray of a specified wavelength corresponding to the period of a change in refractive index (Bragg wavelength) is selectively reflected at a fiber grating. When strain is applied to the detecting element, the period of the fiber grating changes and as a result, the frequency of reflection light shifts. The amount of shift changes in proportion to a strain level in the optical fiber. Accordingly, by determining an amount of change in frequency shift in the Bragg reflection, the strain in the optical fiber can be measured.

<Load Designing Method>

When the pressure receiver 115 and optical fiber 112 are immersed in the liquid 102, the liquid pressure P acting on the pressure receiving surface 125a causes the piston 125 to move so as to apply tension to the strain detecting portion 112A of the optical fiber 112. In case the rigidity of the optical fiber 112 is large, the liquid pressure P cannot compress air in the vessel main body 115A until the air balances with the liquid pressure and a differential pressure between liquid pressure P applied to the pressure receiver 115 and internal pressure therein is applied to the strain detecting portion 112A of the optical fiber 112. In this case, the strain in the strain detecting portion 112A personates the same behavior as that in the case of normal application of load. Strain ($\epsilon$) generated in the strain detecting portion 120A is given by the following equation (2).

$$L=\{(L_v/L_F)/(L_v/L_F-\epsilon) \cdot P_0 \cdot P_0 + (E_P \cdot \epsilon \cdot D_P^2/D_V^2)\}/(\rho \cdot g) \quad (2)$$

where

Figure 14:
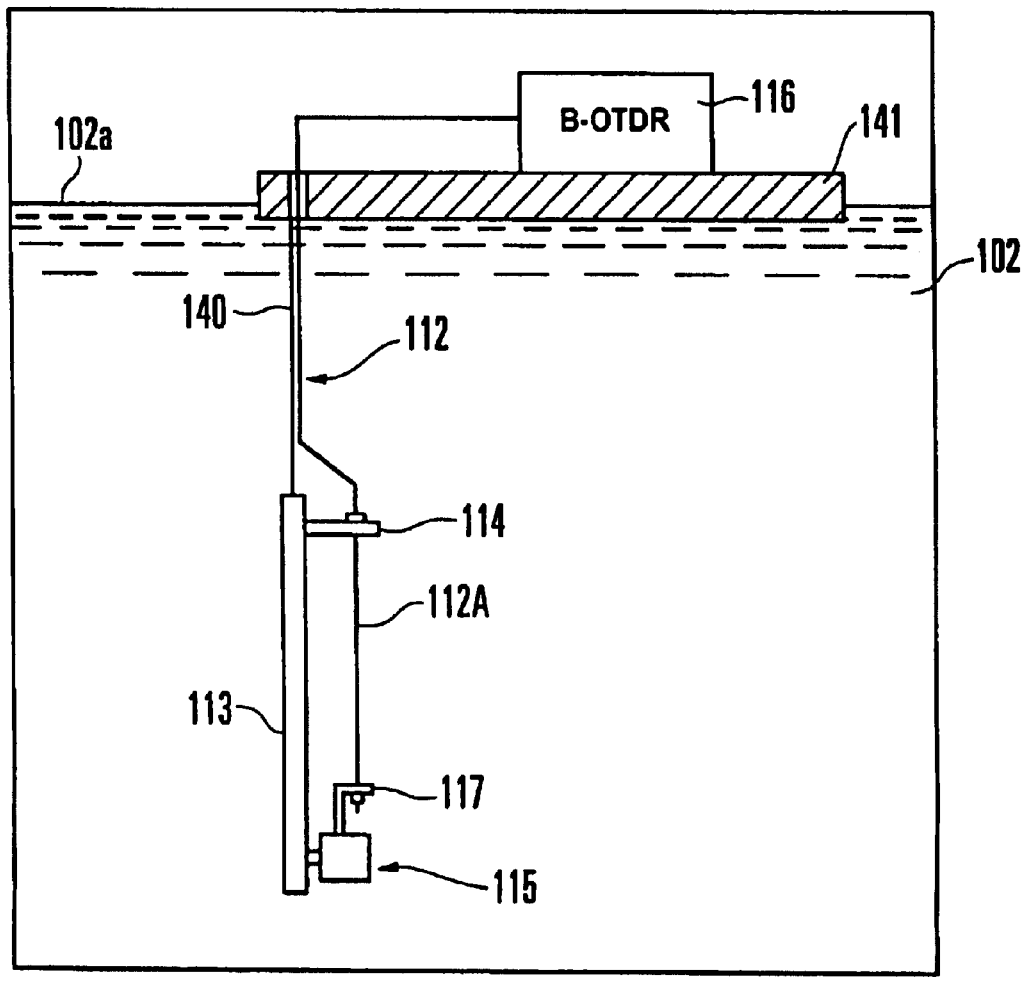
FIG. 14 is a sectional diagram showing a liquid-level gauge according to a fifth embodiment of the invention.

L: water depth $\epsilon$: strain due to elongation of optical fiber core $D_V$: inner diameter of pressure-tight vessel $L_v$: inside length (distance between inner surface and bottom of the piston) in the pressure-tight vessel under atmospheric pressure $D_P$: outer diameter of optical fiber core $L_F$: length of optical fiber core between the fixing members under atmospheric pressure $\rho$: density of liquid g: acceleration of gravity $E_p$: equivalent modulus of elasticity of optical fiber core $P_0$: atmospheric pressure Referring to FIG. 14, there is illustrated a liquid-level gauge according to a fifth embodiment of the invention. In the fifth embodiment, a support base 113 is suspended in water by means of a tension resistant wire 140 and a B-OTDR 116 is installed on a buoyant body 141 such as a ship floating on a liquid level 102a. Other components are identical to those in the fourth embodiment and designated by identical reference numerals with their description omitted.

It will be seen that the liquid level height of the liquid 102 can be measured with the above construction similarly to the foregoing embodiment.

Figure 15:
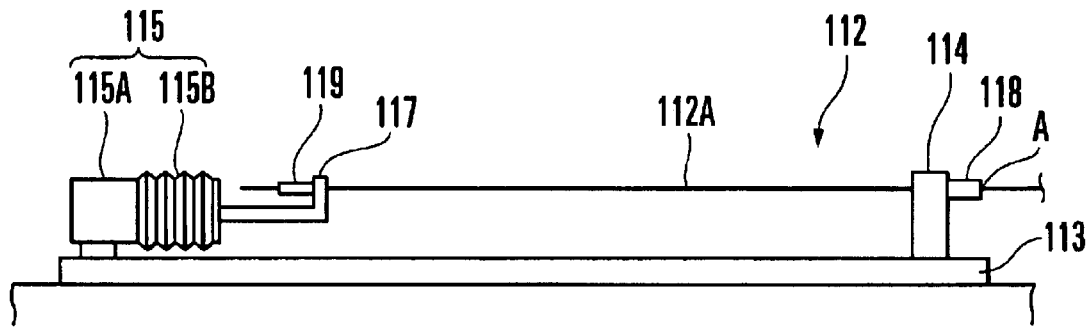
FIG. 15 is a diagram showing a liquid-level gauge according to a sixth embodiment of the invention.
Figure 16:
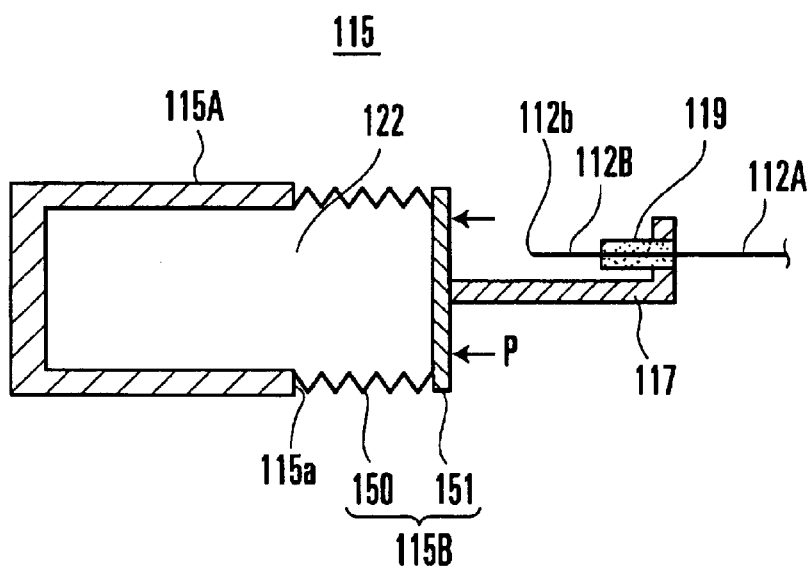
FIG. 16 is a sectional view of a pressure receiver in the sixth embodiment.

Turning to FIGS. 15 and 16, a liquid-level gauge according to a sixth embodiment of the invention will be described. In the present embodiment, a pressure receiving member 115B of pressure receiver 115 is constructed of a bellows 150 provided with a pressure receiving plate 151. The bellows 150 is fixed at one end to an open end surface 115a of a pressure-tight vessel main body 115A having the form of a cylinder opened at one end, thus hermetically closing an opening 122 of the vessel main body 115A and has its other opening to which the pressure receiving 20 plate 151 is mounted. The open end surface 115a of vessel main body 115A functions as a stopper for limiting movement of the bellows 150. One surface of pressure receiving plate 151 serving as a pressure receiving surface is attached with a fixing member 117.

In the liquid-level gauge constructed as above, when applied with a liquid pressure P, the pressure receiving plate 151 displaces in accordance with the pressure to compress and deform the bellows 150. As a result tension is applied to a strain detecting portion 112A of optical fiber 112 to generate strain. Accordingly, by measuring a change in strain by means of the B-OTDR 116, a liquid level height can be measured from the correlation between precedently actually measured liquid level changes and strain changes, similarly to the foregoing embodiments.

In the liquid-level gauge using the bellows 150, the vessel main body 115A can be sealed more steadily than that in the fourth embodiment using the piston 125.

Figure 17:
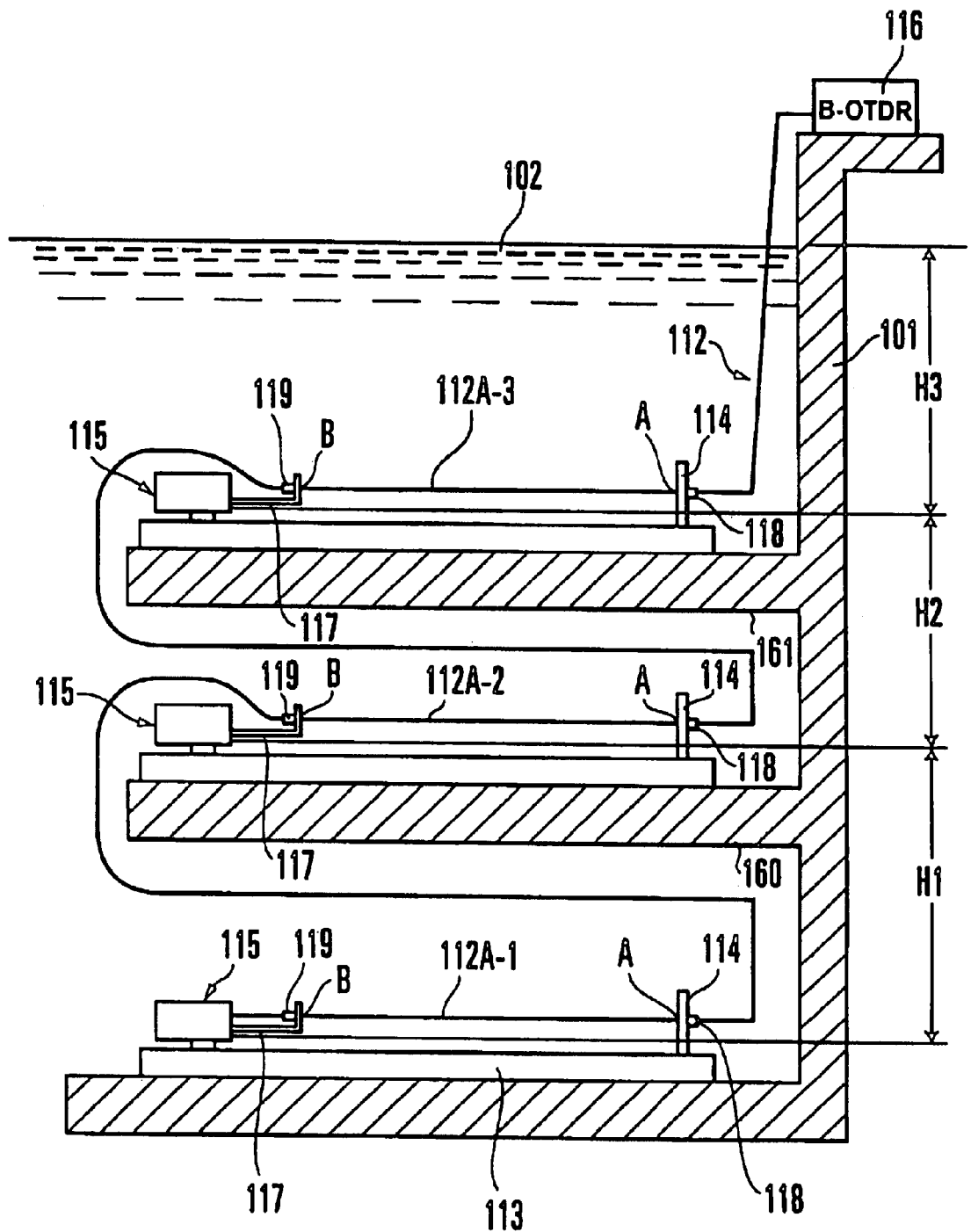
FIG. 17 is a sectional diagram showing a liquid-level gauge according to a seventh embodiment of the invention.

Referring to FIG. 17, a liquid-level gauge according to a seventh embodiment of the invention will be described.

In the present embodiment, three strain detecting portions 112A-1, 112A-2 and 112A-3 are formed at intervals of predetermined distance in a fiber portion of single optical fiber 112 immersed in liquid 102. More specifically, the respective strain detecting portions 112A-1, 112A-2 and 112A-3 are spaced apart from each other in a direction of depth of the liquid 102 and arranged substantially horizontally. Then, three fixing members 114 and three pressure receivers 115 are immersed in the liquid 102 by making the correspondence to the strain detecting portions 112A-1, 112A-2 and 112A-3, respectively. Each of the strain detecting portions 112A-1, 112A-2 and 112A-3 is fixed at one end A to the corresponding fixing member 114 through a pipe 118 and is fixed at the other end B to a fixing member 117 mounted to a pressure receiving member of the corresponding pressure receiver 115 through a pipe 119.

The fixing member 114 for fixing one end A of the lowermost strain detecting portion 112A-1 and the pressure receiver 115 provided with the fixing member 117 for fixing the other end B of that strain detecting portion are arranged on a support base 113 laid on the bottom of a tank 100. The fixing member 114 for fixing one end A of the intermediate strain detecting portion 112A-2 and the pressure receiver 115 provided with the fixing member 117 for fixing the other end of that strain detecting portion are arranged on a first shelf 160 projecting from the inner wall of the tank 100 through the medium of a support base 113. The fixing member 114 for fixing one end of the uppermost strain detecting portion 112A-3 and the pressure receiver 115 provided with the fixing member 117 for fixing the other end of that strain detecting portion are arranged on a second shelf 101 projecting from the inner wall of tank 100 through the medium of a support base 113. The three pressure receivers 115 provided to the individual strain detecting portions 112A-1, 112A-2 and 112A-3 are quite identical to each other and the pressure receiver having the piston type pressure receiving member 115B shown in FIG. 13 or the pressure receiver having the bellows type pressure receiving member shown in FIG. 16 is used as each pressure receiver 115.

In the liquid-level gauge constructed as above, the lowermost strain detecting portion 112A-1 is in charge of measurement of a low liquid level corresponding to a liquid level H1 up to the pressure receiver 115 of intermediate strain detecting portion 112A-2. The intermediate strain detecting portion 112A-2 is in charge of measurement of an intermediate liquid level corresponding to a liquid level H2 up to the pressure receiver 115 of uppermost strain detecting portion 112A-3. Further, the uppermost strain detecting portion 112A-3 is in charge of measurement of a high liquid level corresponding to a liquid level H3 exceeding the pressure receiver 115 of intermediate strain detecting portion 112A-2.

In measurement, when the amount of liquid 102 is small and the actual liquid level H is in the range of H1, in other words, only the pressure receiver 115 of lowermost strain detecting portion 112A-1 is immersed in the liquid 102, a liquid pressure is applied to the pressure receiver 115 of lowermost strain detecting portion 112A-1 only. As a result, tension is applied to the strain detecting portion 112A-1 to generate strain. The strain is measured by the B-OTDR 116 and thereafter, a liquid level height corresponding to the measured value is read from the correlation between precedently measured strain changes and liquid level heights.

As the amount of liquid 102 increases and the actual liquid level H comes into the range of H2, the pressure receiver 115 of intermediate strain detecting portion 112A-2 is immersed in the liquid 102, liquid pressures are applied to the pressure receivers 115 of the lowermost strain detecting portion 112A-1 and intermediate strain detecting portion 112A-2. As a result, tension is applied to the two strain detecting portions 112A-1 and 112A-2 to generate strain. The lowermost strain detecting portion 112A-1 is in association with a maximum measurable liquid level H1 and maximum tension is applied to the strain detecting portion 112A-1 to generate maximum strain. Strain in the lowermost strain detecting portion 112A-1 and strain in the intermediate strain detecting portion 112A-2 are measured by the OTDR 116 and thereafter, a liquid level height (H1+H2) corresponding to the measured values is read from the correlation between the precedently measured strain changes and liquid level heights. In other words, a liquid level height due to the strain in the intermediate strain detecting portion 112A-2 is determined and the thus determined liquid level height is added with the liquid level H1 measured from the strain in the lowermost strain detecting portion 112A-1 to determined an actual liquid level height.

As the amount of liquid 102 further increases and the actual liquid level H becomes H1+H2+H3, the pressure receiver 115 of uppermost strain detecting portion 112A-3 is immersed in the liquid 102 and tension is applied to all of the strain detecting portions 112A-1, 112A-2 and 112A-3 to generate strain. The lowermost strain detecting portion 112A-1 is in the measurable range of maximum liquid level H1 and the intermediate strain detecting portion 112A-3 is in the measurable range of H2, so that they are applied with the maximum tension to generate the maximum strain. The strain in all of the strain detecting portions 112A-1, 112A-2 and 112A-3 is measured by means of the B-OTDR 116 and thereafter, a liquid level height (H1+H2+H3) corresponding to the measured strain is read from the correlation between precedently measured strain changes and liquid level heights. In other words, the liquid level height (H3) due to strain in the uppermost strain detecting portion 112A-3 is determined and the thus determined liquid level height (H3) is added with the liquid levels H1 and H2 measured by the lowermost strain detecting portion 112A-1 and intermediate strain detecting portion 112A-2 to determine an actual liquid level height.

In the construction as above, the ranges of liquid levels measured by the individual strain detecting portions 112A-1, 112A-2 and 112A-3 are distinctively set up and hence, the same maximum tension can be applied to the individual strain detecting portions 112A-1, 112A-2 and 112A-3.

Figure 18:
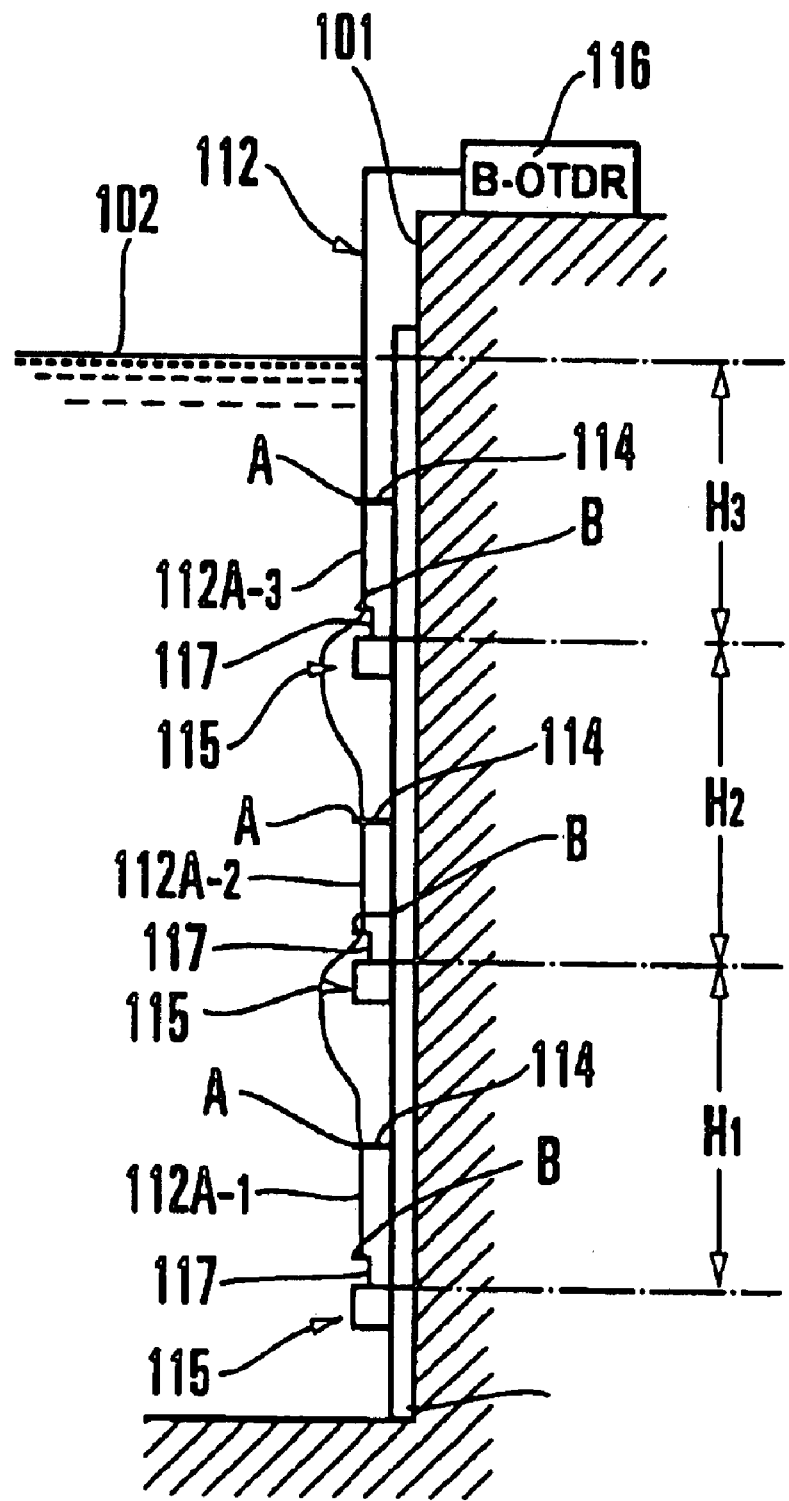
FIG. 18 is a sectional diagram showing a liquid-level gauge according to an eighth embodiment of the invention.

Referring to FIG. 18, a liquid-level gauge according to an eighth embodiment of the invention will be described.

In the present embodiment, an end part of single optical fiber 112 immersed in liquid 102 is suspended vertically along the inner wall of a tank 100 to provide three strain detecting portions 112A-1, 112A-2 and 112A-3 at intervals of predetermined space in a direction of depth of the liquid 102. One end A of each of the strain detecting portions 112A-1, 112A-2 and 112A-3 is fixed to a fixing member 114, with the other end B fixed to a fixing member 117 attached to a pressure receiving member of pressure receiver 115. In other words, the present embodiment differs from the seventh embodiment of FIG. 17 for horizontal arrangement in that the strain detecting portions 112A-1, 112A-2 and 112A-3 are arranged vertically.

With the construction as above, too, it will be clear that the liquid level height can be measured accurately similarly to the seventh embodiment.

Figure 19:
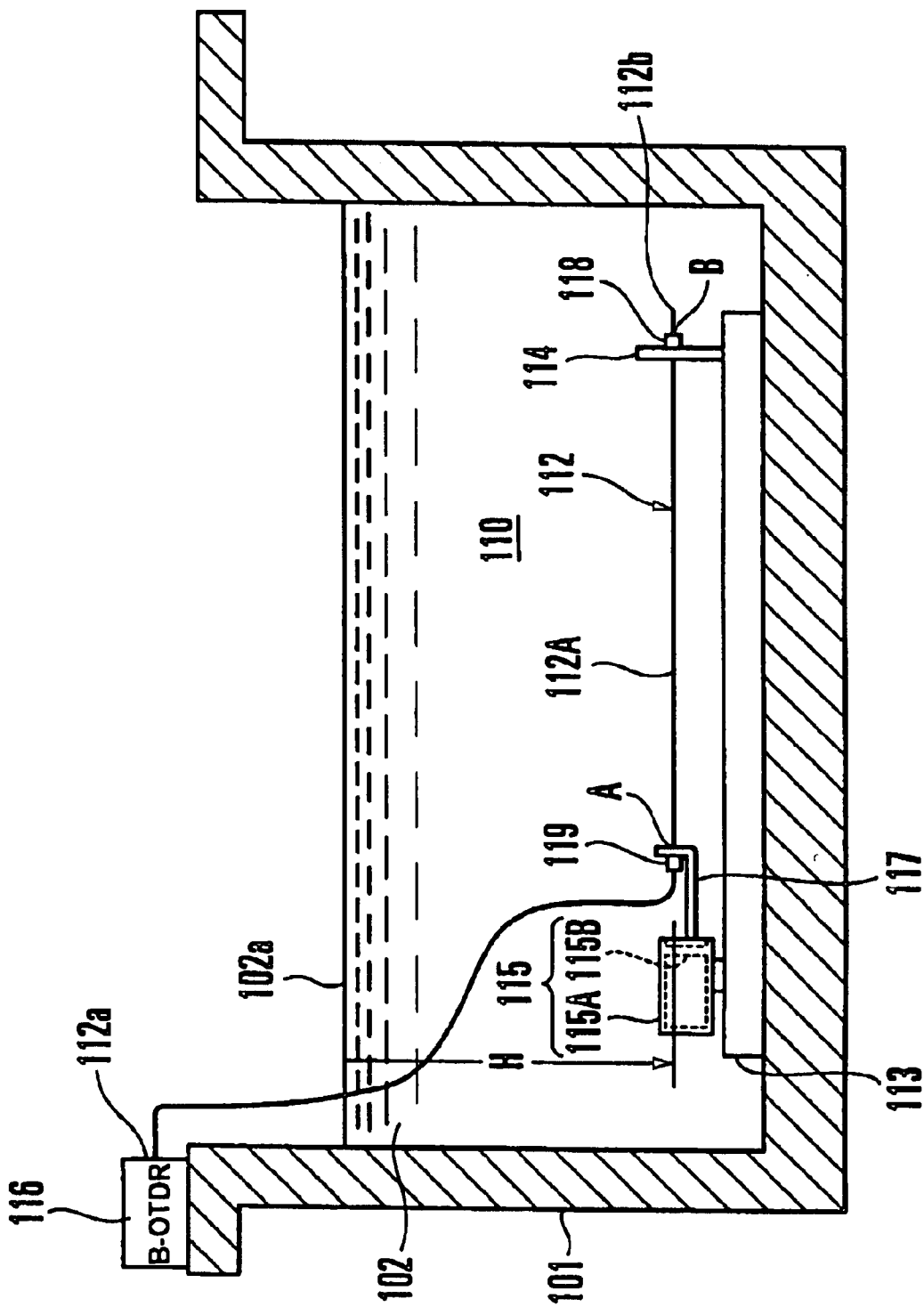
FIG. 19 is a sectional diagram showing a liquid-level gauge according to a ninth embodiment of the invention.
Figure 20:
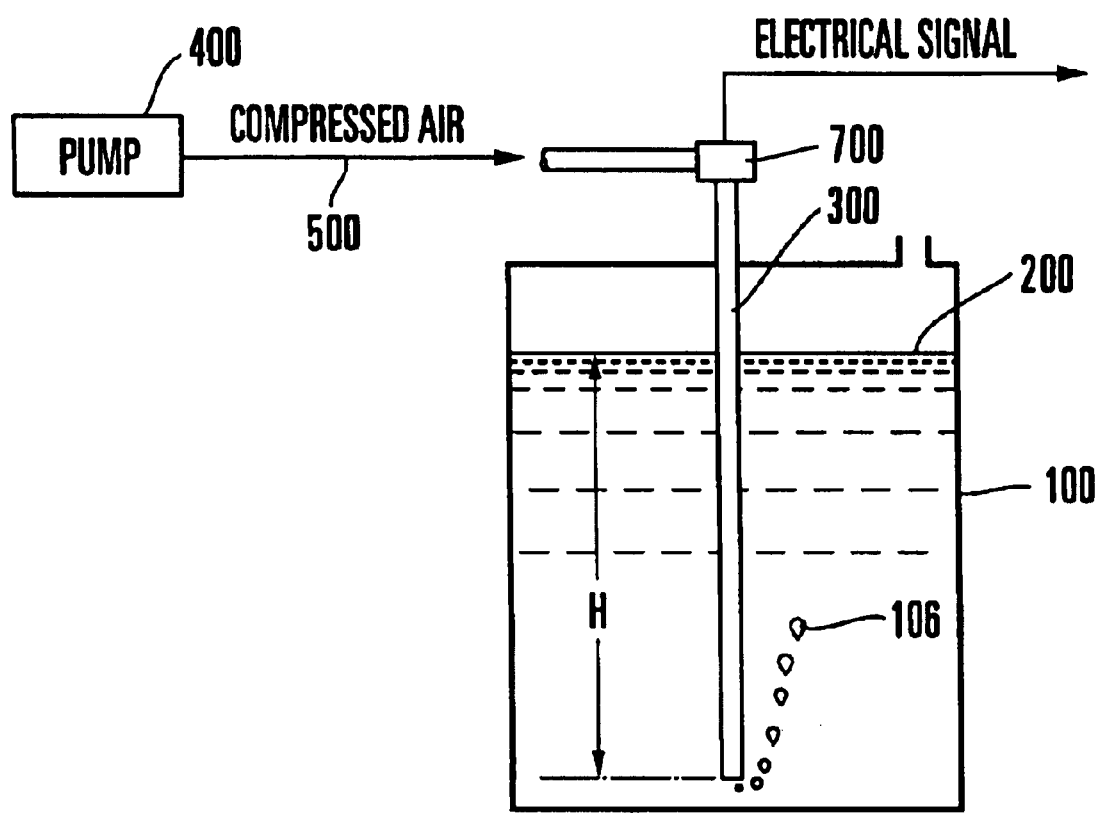
FIG. 20 is a schematic diagram showing an example of conventional barometric liquid-level gauge.

Referring to FIG. 19, a liquid-level gauge according to a ninth embodiment of the invention will be described.

In the present embodiment, a strain detecting portion 112A of an optical fiber 112 has one end A connected to a fixing member 117 attached to a pressure receiving member of pressure receiver 115 and the other end B fixed to a fixing member 114.

With the construction as above, too, it will be clear that the liquid level height can be measured accurately similarly to the fourth to sixth embodiments.

In the foregoing embodiments, measurement of the liquid level height of the liquid 102 in the tank 100 has been exemplified but the invention is not limited to this and may also be used for measurement of the level of liquid placed in hydrostatic pressure condition in, for example, a storing reservoir.

The present invention is not limited to measurement with water representing a liquid but may be used for measurement of the liquid level height of various kinds of liquids such as oil and medicines.

In the foregoing embodiments, the end (A or B) of the strain detecting portion 112A fixed to the pressure receiving member 115B via the fixing member 117 but this is not limitative and that end may be fixed directly to the pressure receiving member 115B.

As described above, the barometric liquid level height measuring method and liquid level gauge according to the invention is so constructed as to measure the liquid level of a liquid by detecting, as a change in strain in the optical fiber, the magnitude of force that is applied to the pressure receiving member of the pressure receiver concomitantly with a change in liquid pressure, whereby the construction can be simplified remarkably and the number of parts can be reduced to facilitate the maintenance and decrease the occurrence of troubles. Especially, the optical fiber is immune to electromagnetic induction so as to be insensible to the influence of disturbance and therefore can also be applied to flammable and non-conductive fluid, thus ensuring that the liquid level of various kinds of liquids can be measured accurately.

Further, since the stopper for limiting the movement of the pressure receiving member to the predetermined range is provided to the pressure receiver, the strain detecting portion of the optical fiber can be prevented from being broken.

In addition, since the ranges of liquid levels to be measured can be set up distinctively by providing a plurality of strain detecting portions, the same maximum tension can be applied to the individual strain detecting portions regardless of the liquid level height.

What is claimed is:

1. A measurement method of a liquid surface comprising:
    measuring the liquid level the liquid by:
        detecting a change in the liquid level, said detecting includes detecting a change in strain in a tension detecting region (5A, 112A) of an optical fiber (5, 112) of a certain length that is dipped in the liquid at least in one portion, said optical fiber supported at two points by a first and a second fixing means, and straining said optical fiber;
wherein the optical fiber is connected to an optical fiber strain gauge (116), the change in the liquid level is detected as a change in strain in the fiber generated in a tension detecting region (5A).

2. A method according to claim 1, comprising:
a float (4) floated in the liquid; and
a fiber support member disposed in the liquid;
wherein said optical fiber (5) is disposed to pass through the float (4); the optical fiber (5) is supported by the float (4) at one portion, and by the fiber support member (14) at another portion; and interval of both support members constitutes the tension detecting region (5A); and
wherein a change in the buoyancy that acted on the float according to the change in the level of the liquid is made to be detected as a change in the optical fiber.

3. A method according to claim 2, comprising:
a pipe body (3) for storing the float (4);
wherein the pipe body (L3) has an upper lid (13) with a small hole (12) through which the optical fiber (5) suspended passes, and the fiber support member which is installed as a bottom plate (14), and a liquid inlet hole is provided in a peripheral surface of the pipe body.

4. A level gauge comprising:
a tension detecting region (5A, 112A) of an optical fiber (5, 112) of a certain length that is dipped in a liquid at least in one portion, supported at two points by a first and a second fixing means, and strained, and an optical fiber strain gauge (116) connected to the optical fiber;
wherein the change in the liquid level is detected as a change in strain in the optical fiber generated in a tension detecting region (5a), thereby measuring the liquid level of the liquid.

5. A level gauge according to claim 4, further comprising:
a float (4) floated in the liquid; and
a fiber support member (14) disposed in the liquid;
wherein said optical fiber (5) is disposed to pass through the float (4); the optical fiber (5) is supported by the float (4) at one portion, and by the fiber support member (14) at another portion;
an interval of both support members constitutes the tension detecting region (5A); and
a change in the buoyancy that acted on the float according to the change in the level of the liquid is made to be detected as a change in the optical fiber.

6. A level gauge according to claim 5, comprising:
a pipe body (3) for storing the float (4);
wherein the pipe body (3) has an upper lid (13) with a small hole (12) through which the optical fiber (5) suspended passes, and the fiber support member which is installed as a bottom plate (14), and a liquid inlet hole is provided in a peripheral surface of the pipe body.

7. A measurement method according to claim 1, comprising:
a float (4) disposed in the liquid; and
a fiber support member (14) disposed in the liquid;
wherein said optical fiber (5) is disposed to pass through the float (4), the optical fiber (5) is supported by the float (4) at one portion, and by the fiber support member (14) at another portion; an interval of both support members constitutes the tension detecting region (5A); and
wherein a change in the buoyancy that acted on the float according to the change in the level of the liquid is made to be detected as a change in the optical fiber.

8. A method of measuring a liquid level comprising:
generating strain in an optical fiber in accordance with liquid pressure, wherein portions of said optical fiber dipped in liquid are coupled to a fixing member and a pressure receiving member provided in a pressure receiver, and
detecting the strain to measure a height of liquid level, wherein tension is applied to a fiber portion between said fixing member and said pressure receiving member to generate strain in said optical fiber when said pressure receiving member is displaced by a liquid pressure, and the strain is detected by means of an optical fiber strain gauge coupled to one end of said optical fiber.

9. A liquid-level gauge comprising:
an elongated optical fiber,
a pressure receiver having a pressure receiving member displaceable by liquid pressure,
a fixing member, and
an optical fiber strain gauge for detecting strain in said optical fiber, wherein portions of said optical fiber dipped in a liquid are coupled to said pressure receiving member and said fixing member, respectively, in the liquid, and one end of said optical fiber being connected to said optical fiber strain gauge.

10. A liquid-level gauge comprising:
a suspension member having a cross-sectional form that is uniform in the height direction and a specific weight value not less than that of liquid,
an optical fiber for dipping said suspension member in the liquid while supporting said suspension member in such a manner that an upper end of said suspension member constantly protrudes from the liquid level, and
an optical fiber strain gauge coupled to said optical fiber for detecting a change in buoyancy acting on said suspension member due to a change in water-level of the liquid as a change in strain in said optical fiber.

11. A liquid-level gauge according to claim 9, wherein said pressure receiver has a pressure-tight vessel main body and said pressure receiving member is a piston movable over an opening of said vessel main body to cover it hermetically.

12. A liquid-level gauge according to claim 9, wherein said pressure receiver has a pressure-tight vessel main body and said pressure receiving member is a bellows having a pressure receiving plate to hermetically cover an opening of said vessel main body.

13. A liquid-level gauge according to claim 9, wherein said pressure receiver is provided with a stopper for limiting movement of said pressure receiving member to a predetermined range.

14. A liquid-level gauge according to claim 13, wherein said optical fiber has a plurality of portions spaced apart from each other in a direction of depth of the liquid and each fixed by the pressure receiving member and the fixing member.

* * * * *

UNITED STATES PATENT AND TRADEMARK OFFICE
CERTIFICATE OF CORRECTION

PATENT NO. : 6,703,635 B2
DATED : March 9, 2004
INVENTOR(S) : Yashiro et al.

It is certified that error appears in the above-identified patent and that said Letters Patent is hereby corrected as shown below:

Title page,
Item [54], Title, please delete "METHOD AND APPARATUS FOR MEASURING THE LEVEL OF LIQUID USING OPTICAL FIBER STRAIN GAUGE" and insert -- METHOD AND APPARATUS FOR MEASURING THE LEVEL OF LIQUID --.

Column 18,
Line 36, please delete "that of liquid" and insert -- that of a liquid --.
Line 44, please delete "change in water-level" and insert -- change in level --.

Signed and Sealed this

Twenty-first Day of December, 2004

JON W. DUDAS
*Director of the United States Patent and Trademark Office*